US00RE39492E

(19) United States
(12) Reissued Patent
Scott

(10) Patent Number: US RE39,492 E
(45) Date of Reissued Patent: Feb. 20, 2007

(54) METHOD FOR SHARPENING BEDKNIVES

(76) Inventor: Keith M. Scott, 2466 Anders, Waterford, MI (US) 48329

(21) Appl. No.: 09/829,274

(22) Filed: Apr. 9, 2001

Related U.S. Patent Documents

Reissue of:
(64) Patent No.: 5,893,792
Issued: Apr. 13, 1999
Appl. No.: 08/971,278
Filed: Nov. 17, 1997

U.S. Applications:
(63) Continuation of application No. 08/795,902, filed on Feb. 5, 1997, now abandoned, which is a continuation of application No. 08/507,942, filed on Jul. 27, 1995, now abandoned.

(51) Int. Cl.
*B24B 1/00* (2006.01)
*B21D 39/03* (2006.01)
*B23P 11/00* (2006.01)

(52) U.S. Cl. ..... 451/45; 29/428; 29/559; 451/234; 451/293; 451/371

(58) Field of Classification Search ..... 451/45, 451/187, 193, 234, 293, 367, 369, 371; 29/428, 29/559
See application file for complete search history.

(56) References Cited

U.S. PATENT DOCUMENTS

| | | | | | |
|---|---|---|---|---|---|
| 79,246 | A | * | 6/1868 | Morse et al. | 451/45 X |
| 1,968,609 | A | | 7/1934 | Madsen | |
| 4,736,544 | A | * | 4/1988 | Greenquist | 451/371 X |
| 4,746,330 | A | * | 5/1988 | Johnson | 451/45 |

FOREIGN PATENT DOCUMENTS

| | | | | |
|---|---|---|---|---|
| DE | 2815729 | * | 10/1979 | 451/234 |
| RU | 1291371 | * | 2/1987 | 451/234 |

* cited by examiner

*Primary Examiner*—Timothy V. Eley
(74) *Attorney, Agent, or Firm*—John R. Benefiel

(57) ABSTRACT

A method of sharpening bedknives for reel type mowers by installing sets of locator surfaces in a bedknife grinder, grinding the surfaces with the grinder to be aligned and parallel, installing a bedknife located against surfaces in both sets, and electromagnetically locking the bedknife in position while grinding the edge to be sharpened. The bedknife is adjusted to be aligned with the reel blades by adjusting the bedknife pivots in the mower.

3 Claims, 3 Drawing Sheets

METHOD FOR SHARPENING BEDKNIVES

Matter enclosed in heavy brackets [ ] appears in the original patent but forms no part of this reissue specification; matter printed in italics indicates the additions made by reissue.

This is a continuation of Ser. No. 08/795,902 filed on Feb. 5, 1997, now abandoned, which is a continuation of Ser. No. 08/507,942, filed on Jul. 27, 1995 now abandoned.

BACKGROUND OF THE INVENTION

This invention concerns sharpening apparatus and more particularly bedknife grinders for sharpening the bedknife used with reel type mowers.

Reel mowers consist of a set of helically formed blades arranged in a generally cylindrical shape. The blades are rotated against a bedknife closely positioned along the perimeter of the reel blade array. Grass being mowed is sheared as each segment of the blades rotate to progressively reduce the clearance with the bedknife, shearing the grass blades between the blades and the bedknife.

Bedknives become dulled with use, such as to require periodic sharpening and truing of the surface defining the clearance space with the blades of the reel blade array.

Bedknives are mounted to the mower op a pair of pivotal mounts fixed to either end of the bedknives. The bedknives clearance is set by a centrally located adjustment attachment, which rotates the bedknife relative to the reel during adjustments, thereby adjusting the cutting clearance.

In conventional sharpening apparatus for bed knives, the bedknife blade has its pivots mounted on a pair of opposing aligned centers, clamped to a rail extending parallel to the ways along which the grinding wheel is traversed during grinding. The bedknife is aligned with the axis of motion of a grinding wheel by means of a fixture gauge with one center being adjustably mounted, such as to enable shifting of the axis of the bedknife relative to the grinder ways in order to render the axis extending through the bedknife centers parallel with the grinder ways.

A separate center support must be installed afterwards to afford sufficient stiffness of the bedknife during grinding.

This manual alignment adjustment is tedious and time consuming, and subject to error. In addition the bedknife often receives a heavy pounding during mowing, such that the pivots on either end often are bent to become substantially out of alignment with each other. Accordingly, the set up procedure described being dependent on the pivots being aligned is ineffective in such instances.

It is the object of the present invention to provide an improved method and apparatus for sharpening bed knives for reel type mowers, which eliminates the need for adjustment of the bedknife supports, which does not depend on the correct alignment of the bedknife pivots and is much less subject to errors in set up.

SUMMARY OF THE INVENTION

This object and others which will become apparent upon a reading of the following specification and claims is achieved by mounting each of a pair of electromagnets to a respective clamping pedestal, secured at spaced locations to a support rail of a bedknife grinder. Each of the electromagnets has a pair of orthogonal locating surfaces fixed thereto, one surface disposed in a vertical plane, and the other in a horizontal plane. The locator surfaces are ground by traversing the grinder wheel across each surface such as to establish precisely aligned orthogonal surfaces which are parallel to the line of movement of the grinder carriage on its way.

The rear edge and bottom surface of each bedknife is placed in position abutting the respective locating surfaces, and the electromagnets thereafter energized to chuck the bedknife in an accurately aligned position with respect to the grinder axis. The normal sharpening of the bedknife is then carried by traversing the grinder wheel over the edge of the bedknife to be sharpened.

It has been determined by the present inventor that the sharpening so conducted and with the bedknife as located in the grinder, achieves a sharpened edge which can be aligned with the mower blades in the mower by adjustment if necessary of the location of pivots at each end of the bedknife such that the sharpened edge can be aligned with the proper clearance established by movement of the center swing arm, notwithstanding that the sharpened edges have not been produced by mounting the bedknife in opposed centers as per the conventional practice.

The bedknife can also be secured with mechanical clamps to the locating surfaces as a safety measure.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
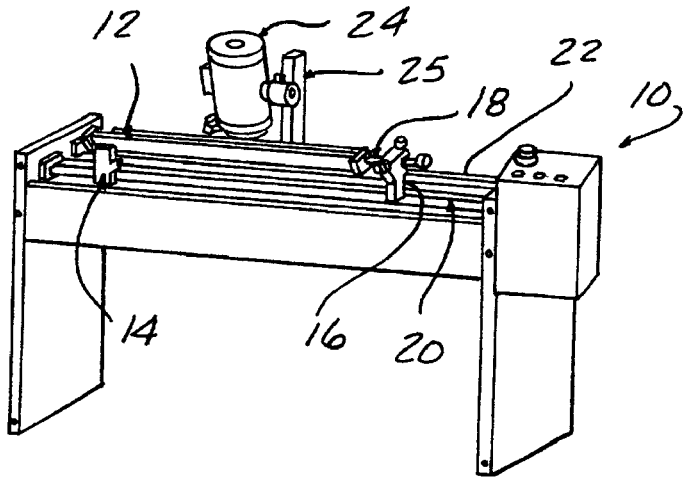
FIG-1 PRIOR ART
FIG. 1 is a perspective view of a bedknife sharpener grinder having bedknife mounting arrangement according to the prior practice.

Referring to FIG. 1, a prior art bedknife grinder 10 is depicted in which a bedknife 12 is mounted between centers 14 and 16 engaging the pivot points 18 on which the bedknife 12 is supported in the mower. The centers 14, 16 are clamped to a support rail 20 extending parallel to ways 22 on which a grinding motor 24 carriage 25 is traversed by means of a power screw (not shown). In order to properly set up the machine for grinding, the bedknife 12 axis is aligned with the carriage ways 22 by means of a gauge and adjustment of the right hand center 16. This requires a tedious process in preparation for grinding the bedknife 12. In addition if the pivots 18 are bent out of alignment, as they often are, inaccurate results are inevitable.

A center support (not shown) must be installed after adjustment to provide a sufficiently rigid support for the bedknife 12 to withstand the forces imposed during grinding.

Figure 2:
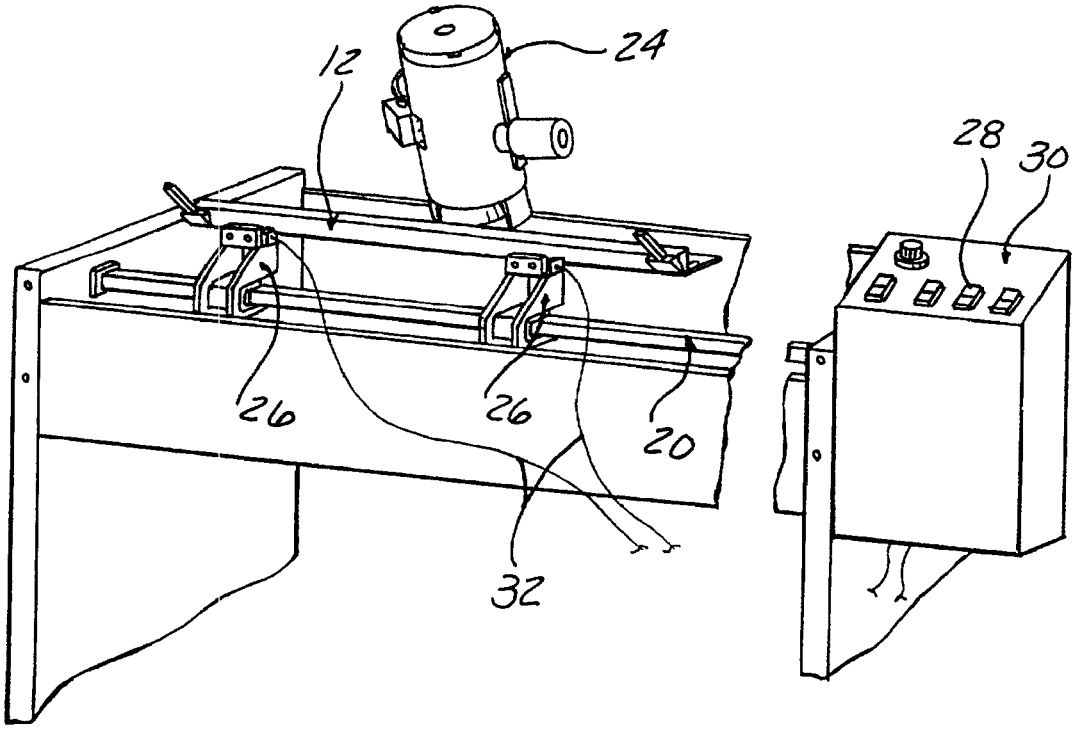
FIG. 2 is a fragmentary enlarged view of the bedknife grinder shown in FIG. 1 having the bedknife mounting arrangement according to the present invention, installed therein.

Referring to FIG. 2, the bedknife holding arrangement according the present invention, consists of a spaced apart pair of electromagnet holders 26, each clamped to the center support rail 20. The bedknife 12 is held in the electromagnet holders 26 by electromagnets energized by operation of a switch 28 in the machine control panel 30, connected to the wiring 32 associated with electromagnets in the holders 26.

Figure 3:
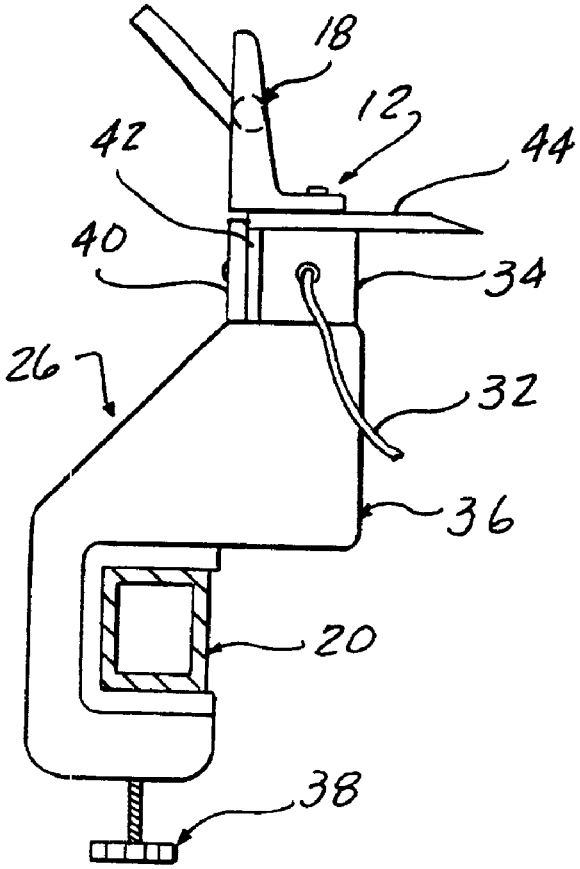
FIG. 3 is a endwise view of a transverse section taken through the bedknife mount support rail, showing one of the bedknife holders shown in FIG. 2.

Referring to FIG. 3, the details of the electromagnet holders 26 can be seen. Each holder 26 includes an electromagnet 34 fixed atop a clamping member 36, having a U shaped portion adapted to receive the support rail 20. A clamping screw 38 enables securement of the clamping member 36 in the installed position shown.

A set of locating plates are attached to the electromagnet 34 including an outer locator plate 40 projecting a short distance above the upper surface of the electromagnet 34. A second locator plate 42 has its upper surface affixed to the rear face of the electromagnet 34 having its upper edge flush with the top of the electromagnet 34.

Figure 4:
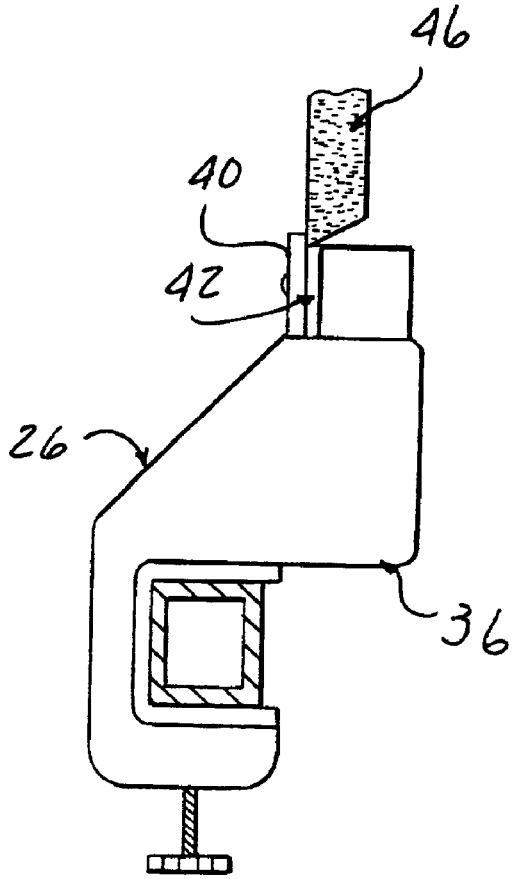
FIG. 4 is an end view of the vertical locator surfaces, included in the electromagnet holder being ground by a pass of the grinding wheel.
Figure 5:
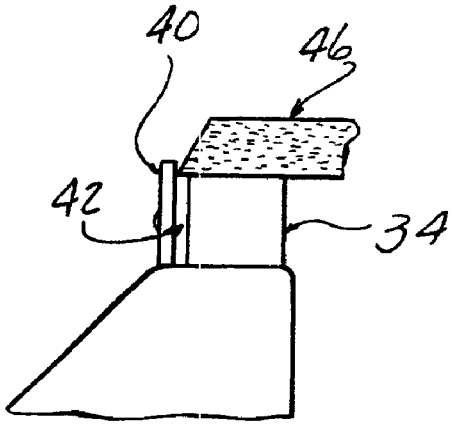
FIG. 5 is a fragmentary end view of one of the electromagnet bedknife holders showing a grinding of the horizontal locator surface, being ground true by a pass of the grinder.

According to the concept of the present invention, the rear plate 40 provides a vertical locator surface in which is abutted the bedknife blade 44 while the top of the electromagnet 34 and top edge of the inner locator plate 42 define a horizontal surface on which the bedknife blade 44 is held. The alignment of the respective sets of surfaces with the grinder carriage ways is accurately established by grinding both surfaces after installation of the electromagnetic holders 26 on the rail 20. The grinding wheel 46 of the grinder 24 is set in a vertical position and traversed to pass the face of both rear locator plates 40 as shown in FIG. 4 in a single pass.

Similarly the top of the electromagnet 34 and inner locator plate 42 of each holder 26 are both ground by traversing the grinding wheel 46 past both surfaces in a single pass with the wheel in a horizontal position.

Thus, the respective locator surface sets of the holders 26 have their locator surfaces perfectly parallel and aligned with each other and with the grinder carriage way 22.

Subsequently, each bedknife 12 to be sharpened need merely be placed in position atop the electromagnetic holders 26 and against the locator surfaces with the blade 44 against the locator surfaces. Energization of the electromagnets 34 securely holds the bedknife 12 in the precisely located position.

The grinding wheel 46 is then adjusted to a proper angle in position and traversed along the bedknife edge so as to sharpen the edge in the proper manner. This procedure can be quickly executed such as to speed and simplify the installation process while yielding superior accuracy. It can also be appreciated that the proper alignment of the bedknife pivots 18 does not affect the accuracy of the operation.

Subsequently upon installation of the bedknife is the mower, if any out of parallel condition of the bedknife with the mower reel exists, the adjustment of the adjustment center supports can correct the condition.

Figure 6:
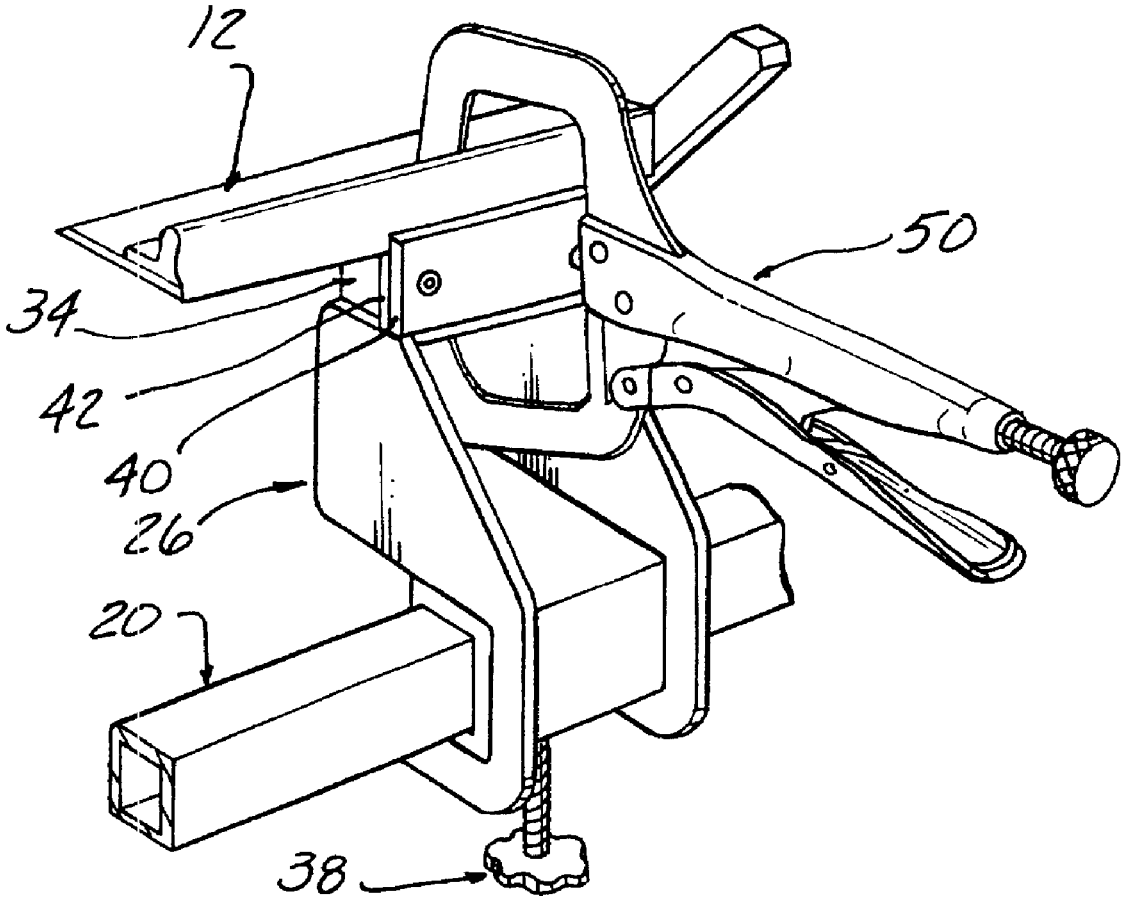
FIG. 6 is a perspective fragmentary view of one of the electromagnet bedknife holders with a bedknife installed using a clamp as a safety measure to hold the bedknife in addition to the electromagnetic hold down forces.

FIG. 6 illustrates the use of a clamp 50 which may be used with each electromagnet holder 26 clamp 50 provides an additional securement holding, the bedknife 12 against the locator plates 40, 42 atop the electromagnet 34 as the clamp is a safety measure preventing the bedknife from coming loose upon the failure of the electromagnet 34 or the inadvertent switching off of the electromagnet 34 during operation of the bedknife grinder.

In the claim:

1. A method of sharpening bedknives adapted to be installed in a reel blade mower by means of a *bedknife* pivot [mounted] *mount* at each end, comprising the steps of:

mounting a spaced set of horizontal locator surfaces on a [fixed] support rail in a bedknife grinder;

positioning each bedknife to be sharpened against said horizontal locator surfaces, with the bottom of said bedknife against said horizontal locator surfaces;

energizing the electromagnet associated with each locator surface set to hold the bedknife against the surfaces, and thereafter operating the bedknife grinder by traversing *a* [the] grinding wheel *included in said bedknife grinder* along the bedknife so as to sharpen the bedknife as it is held in against said locator surfaces.

2. The method according to claim 1 further including the step of aligning the bedknife pivot mounts to a reel blade installed in said reel mower by adjusting the pivot mount positions in the reel mower.

3. The method according to claim 1 further including the step of aligning each bedknife on said locator horizontal surfaces by positioning an edge of said bedknife against vertical locator surfaces prior to energizing each electromagnet.

* * * * *